(12) United States Patent
Hosoya (10) Patent No.: US 7,576,359 B2
(45) Date of Patent: Aug. 18, 2009

(54) LIQUID CRYSTAL DISPLAY DEVICE AND METHOD FOR MANUFACTURING THE SAME

(75) Inventor: Kunio Hosoya, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 171 days.

(21) Appl. No.: 11/496,400

(22) Filed: Aug. 1, 2006

(65) Prior Publication Data

US 2007/0035676 A1    Feb. 15, 2007

(30) Foreign Application Priority Data

Aug. 12, 2005    (JP)    ............... 2005-234160

(51) Int. Cl.
*H01L 31/00* (2006.01)

(52) U.S. Cl. .................. 257/59; 349/42; 349/43; 349/44; 349/45; 349/46; 438/149

(58) Field of Classification Search .......... 257/E29.117, 257/E29.1, 443, 59; 438/149; 349/42, 43, 349/44, 45, 46
See application file for complete search history.

(56) References Cited

U.S. PATENT DOCUMENTS

| | | | |
|---|---|---|---|
| 5,701,055 A | | 12/1997 | Nagayama et al. |
| 5,757,453 A | * | 5/1998 | Shin et al. .................. 349/122 |
| 5,784,133 A | * | 7/1998 | Kim et al. .................. 349/44 |
| 5,894,136 A | * | 4/1999 | Wook .......................... 257/59 |
| 5,952,037 A | | 9/1999 | Nagayama et al. |
| 5,994,717 A | * | 11/1999 | Igarashi et al. ............... 257/59 |
| 5,995,174 A | * | 11/1999 | Ukita .......................... 349/43 |
| 6,330,042 B1 | * | 12/2001 | Kang et al. .................. 349/43 |
| 6,429,916 B1 | * | 8/2002 | Nakata et al. ............... 349/106 |
| 6,784,457 B2 | | 8/2004 | Yamazaki et al. |
| 7,061,565 B2 | * | 6/2006 | Kwon et al. ................. 349/139 |
| 2002/0084459 A1 | * | 7/2002 | Choi et al. .................... 257/72 |
| 2002/0176032 A1 | * | 11/2002 | Maeda et al. ................. 349/43 |

(Continued)

FOREIGN PATENT DOCUMENTS

JP    03-023429    1/1991

(Continued)

OTHER PUBLICATIONS

Office Action (Application No. 200610110957.7) dated May 8, 2009.

*Primary Examiner*—David Vu
*Assistant Examiner*—Brandon Fox
(74) *Attorney, Agent, or Firm*—Eric J. Robinson; Robinson Intellectual Property Law Office, P.C.

(57) ABSTRACT

To provide a liquid crystal display device with high visibility by forming a light shielding film without requiring additional steps. The liquid crystal display device of the invention has a structure in which liquid crystal is injected and sealed between an active matrix substrate over which a pixel portion including a plurality of TFTs, wires, first electrodes (pixel electrodes) and the like are formed and a counter substrate over which a second electrode (counter electrode), a colored film and the like are formed. A part of a conductive film forming electrodes of the TFTs, the wires and the like formed over the active matrix substrate functions as a light shielding film in the pixel portion.

17 Claims, 8 Drawing Sheets

U.S. PATENT DOCUMENTS

| | | | |
|---|---|---|---|
| 2004/0100191 A1* | 5/2004 | Park | 313/506 |
| 2004/0263722 A1* | 12/2004 | Oh et al. | 349/106 |
| 2005/0040400 A1 | 2/2005 | Yamazaki et al. | |
| 2005/0127825 A1* | 6/2005 | Bae et al. | 313/504 |

FOREIGN PATENT DOCUMENTS

| | | | |
|---|---|---|---|
| JP | 03023429 A * | 1/1991 | |
| JP | 10-288796 A | 10/1998 | |
| JP | 2001-175198 A | 6/2001 | |
| JP | 2003-021829 | 1/2003 | |

* cited by examiner

LIQUID CRYSTAL DISPLAY DEVICE AND METHOD FOR MANUFACTURING THE SAME

BACKGROUND OF THE INVENTION

1. Field of the Invention

The present invention relates to an active matrix liquid crystal display device and a method for manufacturing the same.

2. Description of the Related Art

An active matrix liquid crystal display device using an active element such as a thin film transistor (TFT) is previously known. The active matrix liquid crystal display device can have higher pixel density, and is small and lightweight with low power consumption. Thus, products such as a monitor of a personal computer, a liquid crystal television, and a monitor of a car navigation system have been developed using the active matrix liquid crystal display device as one of the flat panel displays substituted for CRTs.

A liquid crystal display device has a structure in which a substrate (active matrix substrate) over which a pixel portion including a plurality of TFTs, wires, first electrodes (pixel electrodes) and the like, and the like are formed is attached to a substrate (counter substrate) over which a second electrode (counter electrode), a light shielding film (black matrix), a colored film (color filter), and the like are formed. Further, in the liquid crystal display device, liquid crystal is injected and sealed between the two substrates, and images are displayed by aligning liquid crystal molecules by an electric field applied between the pixel electrodes and the counter electrode, and controlling the amount of light from a light source.

A plurality of pixels are arranged in matrix over the active matrix substrate, and the first electrodes (pixel electrodes) in the pixels are formed independently of each other. Therefore, there is a problem in that light leakage occurs in a portion that is not used for the display, such as between the first electrodes (pixel electrodes), leading to reduced contrast and lower visibility. In order to prevent such light leakage, the light shielding film (black matrix) is provided on the counter substrate side or the active matrix substrate side (for example, see Patent Document 1).

[Patent Document 1] Japanese Patent Laid-Open No. 2003-21829

However, the light shielding film (black matrix) is formed through steps of deposition, resist coating, baking, light exposure, etching, and the like, which causes a further reduction in yield in manufacturing of the liquid crystal display device having complicated steps.

SUMMARY OF THE INVENTION

In view of the foregoing, the invention provides a liquid crystal display device with high visibility by forming a light shielding film without requiring additional steps.

A liquid crystal display device of the invention has a structure in which a pixel portion including a plurality of TFTs, wires, first electrodes (pixel electrodes) and the like, and the like are formed over an active matrix substrate, a second electrode (counter electrode), a colored film and the like are formed over a counter substrate, and liquid crystal is injected and sealed between the two substrates. A part of a conductive film forming electrodes of the TFTs, the wires and the like formed over the active matrix substrate functions as a light shielding film in the pixel portion. A specific structure of the invention is a liquid crystal display device including: a semiconductor film formed over a gate electrode and a gate line with a gate insulating film interposed therebetween; an insulator formed over the semiconductor film; a source region and a drain region that are separately formed over the semiconductor film so as not to overlap the insulator; a source electrode and a drain electrode that are formed over the source region and the drain region; a light shielding film formed over the insulator; and a protective film formed over the light shielding film, the source electrode, and the drain electrode, wherein the insulator is formed between the source region and the drain region, and wherein the protective film is formed in contact with both side faces of the insulator.

Another structure of the invention is a liquid crystal display device including: a first semiconductor film formed over a gate electrode obtained from a first conductive film and a gate line with a gate insulating film interposed therebetween; a first insulator and a second insulator that are formed over the first semiconductor film; a source region and a drain region that are separately obtained from a second semiconductor film formed over the first semiconductor film, the first insulator, and the second insulator; and a source electrode, a drain electrode, a source line, a first light shielding film, and a second light shielding film that are separately obtained from a light shielding second conductive film formed over the second semiconductor film, wherein the first light shielding film is formed over the first insulator; the source line is formed over the second insulator; the first light shielding film is formed so as to overlap the gate electrode; and the source line is electrically connected to the source electrode.

Another structure of the invention is a liquid crystal display device including: a first semiconductor film formed over a gate electrode obtained from a first conductive film and a gate line with a gate insulating film interposed therebetween; a first insulator and a second insulator that are formed over the first semiconductor film; a source region and a drain region that are separately obtained from a second semiconductor film formed over the first semiconductor film, the first insulator, and the second insulator; and a source electrode, a drain electrode, a source line, a first light shielding film, and a second light shielding film that are separately obtained from a light shielding second conductive film formed over the second semiconductor film, wherein the source line is formed over the second insulator and partially overlaps the gate line.

Another structure of the invention is a liquid crystal display device including: a first semiconductor film formed over a gate electrode obtained from a first conductive film and a gate line with a gate insulating film interposed therebetween; a first insulator and a second insulator that are formed over the first semiconductor film; a source region and a drain region that are separately obtained from a second semiconductor film formed over the first semiconductor film, the first insulator, and the second insulator; and a source electrode, a drain electrode, a source line, a first light shielding film, and a second light shielding film that are separately obtained from a light shielding second conductive film formed over the second semiconductor film, wherein a first electrode (pixel electrode) that is electrically connected to the drain electrode and an auxiliary wire for electrically connecting the source line to the source electrode are formed of the same conductive film.

Another structure of the invention is a liquid crystal display device including: a first semiconductor film formed over a gate electrode obtained from a first conductive film and a gate line with a gate insulating film interposed therebetween; a first insulator and a second insulator that are formed over the first semiconductor film; a source region and a drain region that are separately obtained from a second semiconductor film formed over the first semiconductor film, the first insulator, and the second insulator; and a source electrode, a drain electrode, a source line, a first light shielding film, and a second light shielding film that are separately obtained from a light shielding second conductive film formed over the second semiconductor film, wherein the second light shielding film is formed so as not to overlap the first insulator and the second insulator; and a first electrode that is electrically connected to the drain electrode overlaps a part of the second light shielding film.

Further, the invention provides a method for manufacturing a liquid crystal display device, specifically including the steps of: forming a gate insulating film over a gate electrode obtained from a first conductive film and a gate line; forming a first semiconductor film over the gate insulating film; forming a first insulator and a second insulator over a part of the first semiconductor film; forming a second semiconductor film over the first semiconductor film, the first insulator, and the second insulator to separately form a source region and a drain region so as not to overlap the first insulator and the second insulator; and forming a light shielding second conductive film over the second semiconductor film to separately form a source electrode over the source region, a drain electrode over the drain region, a first light shielding film over the first insulator, a source line over the second insulator; and a second light shielding film so as not to overlap the first insulator and the second insulator.

According to another structure of the invention, a method for manufacturing a liquid crystal display device includes the steps of: forming a gate insulating film over a gate electrode obtained from a first conductive film and a gate line; forming a first semiconductor film over the gate insulating film; forming a first insulator and a second insulator over a part of the first semiconductor film; forming a second semiconductor film over the first semiconductor film, the first insulator, and the second insulator to separately form a source region and a drain region so as not to overlap the first insulator and the second insulator; forming a light shielding second conductive film over the second semiconductor film to separately form a source electrode over the source region, a drain electrode over the drain region, a first light shielding film over the first insulator, a source line over the second insulator, and a second light shielding film so as not to overlap the first insulator and the second insulator; and simultaneously forming of the same conductive film a first electrode that is electrically connected to the drain electrode and a connecting wire for electrically connecting the source line to the source electrode.

According to another structure of the invention, a method for manufacturing a liquid crystal display device includes the steps of: forming a gate insulating film over a gate electrode obtained from a first conductive film and a gate line; forming a first semiconductor film over the gate insulating film; forming a first insulator and a second insulator over a part of the first semiconductor film; forming a second semiconductor film over the first semiconductor film, the first insulator, and the second insulator to separately form a source region and a drain region so as not to overlap the first insulator and the second insulator; forming a light shielding second conductive film over the second semiconductor film to separately form a source electrode over the source region, a drain electrode over the drain region, a first light shielding film over the first insulator, a source line over the second insulator; and a second light shielding film so as not to overlap the first insulator and the second insulator; and forming a first electrode that is electrically connected to the drain electrode and overlaps a part of the second light shielding film.

Note that in each of the aforementioned structures, the second semiconductor film is made of one of an amorphous semiconductor and a semi-amorphous semiconductor each of which mainly contains silicon or silicon-germanium Moreover, in each of the aforementioned structures, the thickness of the first insulator and the second insulator is larger than the thickness of a stacked film of the second semiconductor film and the second conductive film.

In the liquid crystal display device of the invention, over an active matrix substrate as one of a pair of substrates between which liquid crystal is injected and sealed, a light shielding film as well as a driver circuit constituted by a plurality of TFTs, wires and the like, and a plurality of TFTs, wires, pixel electrodes and the like are formed without requiring additional steps. According to the invention, it is not necessary to provide additional steps to form a light shielding film as in the conventional cases. Thus, a liquid crystal display device with high visibility can be manufactured with high yield.

Moreover, in the liquid crystal display device of the invention, when a TFT formed over an active matrix substrate is a bottom gate TFT having an active layer made of an amorphous semiconductor or a semi-amorphous semiconductor and a light source is provided on a counter substrate side, a light shielding film is provided so as to overlap an active layer of the TFT. Accordingly, in addition to the aforementioned effect, a leakage current can be prevented from being generated between a source region and a drain region when the TFT is driven. In that case, the light shielding film can be provided without increasing the number of manufacturing steps if the bottom gate TFT is a channel stop (protected) type.

DETAILED DESCRIPTION OF THE INVENTION

Although the invention will be described by way of embodiment modes with reference to the accompanying drawings, it is to be understood that various changes and modifications will be apparent to those skilled in the art. Therefore, unless such changes and modifications depart from the scope of the invention, they should be construed as being included therein.

Embodiment Mode 1

In Embodiment Mode 1, a structure of an active matrix substrate that can be applied to a liquid crystal display device of the invention is described with reference to FIG. 1.

Figure 1:
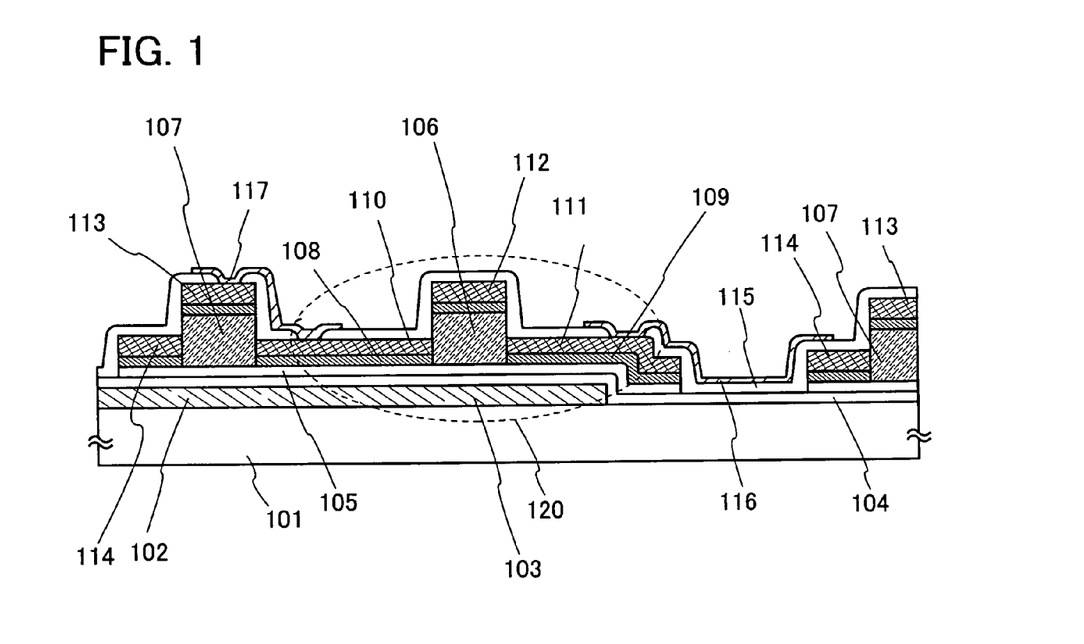
FIG. 1 is a diagram showing a structure of an active matrix substrate.

In FIG. 1, a bottom gate thin film transistor (TFT) 120 is formed over a substrate 101. The substrate 101 may be a glass substrate, a quartz substrate, a substrate made of an insulating substance such as ceramics such as alumina, a plastic substrate, a silicon wafer, a metal plate, or the like.

In addition, although not shown in FIG. 1, a silicon nitride film, a silicon oxide film, a silicon nitride oxide film, or a stacked film of them may be formed as a blocking film over the substrate 101 in order to prevent impurities from entering a semiconductor film and the like from the substrate 101.

A gate line 102 and a gate electrode 103 as a part of the gate line 102 are formed over the substrate 101. The gate line 102 and the gate electrode 103 can be formed of a film containing a metal element such as Ag, Au, Cu, Ni, Pt, Pd, Ir, Rh, W, Al, Ta, Mo, Cr, Cd, Zn, Fe, Ti, Zr, Ba, and Nd, a film containing an alloy material that mainly contains these elements, a stacked film in which Mo, Al, and Mo are stacked in this order, a stacked film of Ti, Al, and Ti, a stacked film of MoN, Al—Nd, and MoN, a stacked film of Mo, Al—Nd, and Mo, a stacked film of Cr and Al, a film containing a compound material such as metal nitride, a film containing Si or SiGe including an acceptor element or a donor element, an indium tin oxide (ITO) film used as a transparent conductive film, an IZO (Indium Zinc Oxide) film in which zinc oxide (ZnO) of 2 to 20 wt % is mixed with indium oxide, an ITO film containing silicon oxide, or the like. The thickness of the gate line 102 and the gate electrode 103 is preferably 200 nm or more, and more preferably 300 to 500 nm.

An insulating film 104 is formed over the gate line 102 and the gate electrode 103, and a part of the insulating film 104 is a gate insulating film of the TFT 120. The insulating film 104 (including the gate insulating film) has a single layer structure or a stacked layer structure using a silicon oxide film, a silicon nitride film, a silicon oxynitride film, a silicon nitride oxide film, other insulating films containing silicon, or the like. The thickness of the insulating film 104 is preferably 10 to 150 nm, and more preferably 30 to 70 nm.

A first semiconductor film 105 is formed over the insulating film 104 including the gate insulating film as a part thereof. The first semiconductor film 105 can be formed using a film including one of an amorphous semiconductor mainly containing silicon, silicon-germanium (SiGe) or the like, and a semi-amorphous semiconductor (hereinafter referred to as an SAS) having an intermediate structure between an amorphous state and a crystalline state. Among semi-amorphous semiconductors, a microcrystalline state in which a crystal grain of 0.5 to 20 nm can be observed is called a microcrystal (hereinafter referred to as a μc). In addition to the aforementioned main components, an acceptor element or a donor element such as phosphorus, arsenic, and boron may also be contained. The thickness of the first semiconductor film 105 is preferably 10 to 150 nm, and more preferably 30 to 70 nm.

A first insulator 106, a second insulator 107, and a third insulator (not shown) are formed over the first semiconductor film 105. Note that the third insulator is described in Embodiment Mode 2.

The first insulator 106, the second insulator 107, and the third insulator have a single layer structure or a stacked layer structure using a silicon oxide film, a silicon nitride film, a silicon oxynitride film, a silicon nitride oxide film, or other insulating films containing silicon. The thickness of the first insulator 106, the second insulator 107, and the third insulator is set to be larger than the thickness of a stacked film of a source region 108 and a source electrode 110 that are formed later, and the thickness of a stacked film of a drain region 109 and a drain electrode 111 that are formed later. Specifically, a thickness of 500 nm or more is preferably adopted. When the first insulator 106, the second insulator 107, and the third insulator have such a thickness, a source electrode 110, a drain electrode 111, a first light shielding film 112, a source line 113, a second light shielding film 114, and a third light shielding film (not shown) can be separately formed of the same conductive film in a subsequent step. Moreover, these insulators are preferably formed into a substantially perpendicular shape or a reversed taper shape. Here, the taper angle means the angle of a side of the insulator with respect to the bottom thereof. That is to say, the reversed taper shape has larger than an angle of 90°, and the substantially perpendicular shape has an angle of 90° (±1°).

A second semiconductor film including a source region 108 and a drain region 109 is formed over the first semiconductor film 105, the first insulator 106, the second insulator 107, and the third insulator. The second semiconductor film is made of a semiconductor film such as an amorphous semiconductor film, an SAS film, and a μc film, each of which mainly contains silicon, silicon-germanium (SiGe), or the like. The second semiconductor film used here contains an acceptor element or a donor element such as phosphorus, arsenic, and boron additionally to the aforementioned main components. The thickness of the second semiconductor film is preferably 10 to 150 nm, and more preferably 30 to 70 nm.

The source electrode 110 is formed over the source region 108, the drain electrode 111 is formed over the drain region 109, the first light shielding film 112 is formed so as to overlap the first insulator 106, the source line 113 is formed so as to overlap the second insulator 107, the second light shielding film 114 is formed so as not to overlap the first insulator 106 and the second insulator 107, and the third light shielding film (not shown) is formed so as to overlap the third insulator.

The source electrode 110, the drain electrode 111, the first light shielding film 112, the source line 113, and the second light shielding film 114 are made of a light shielding conductive material, and the thickness thereof is preferably 200 nm or more, and more preferably 300 to 500 nm. The conductive material used here may be a film containing a metal element such as Ag, Au, Cu, Ni, Pt, Pd, Ir, Rh, W, Al, Ta, Mo, Cr, Cd, Zn, Fe, Ti, Zr, and Ba, a film containing an alloy material that mainly contains these elements, a film containing a compound material such as metal nitride, or the like. Alternatively, a film containing Si or SiGe including an acceptor element or a donor element may also be used.

Among the aforementioned films, the first light shielding film 112, the second light shielding film 114, and the third light shielding film (not shown) are formed to cover the periphery of pixels of a pixel portion over the active matrix substrate, and thus have a function as a light shielding film to prevent light leakage in image display.

The gate electrode 103 and the first light shielding film 112 partially overlap each other, and the gate line 102 and the source line 113 partially overlap each other. According to the invention, however, the first insulator 106 is sandwiched between the gate electrode 103 and the first light shielding film 112, and the second insulator 107 is sandwiched between the gate line 102 and the source line 113; therefore, parasitic capacitance in each overlapping portion can be reduced.

Further, if the TFT 120 formed over the substrate is a bottom gate TFT as shown in FIG. 1, when the first light shielding film 112 is provided so as to overlap a part of the first semiconductor film 105 (channel forming region of the TFT 120), an active layer (channel forming region) of the TFT 120 can be prevented from being irradiated with light even if light is emitted from a side of the substrate 101 over which the TFT 120 is formed. The prevention of irradiation of the active layer (channel forming region) of the TFT 120 with light can prevent effects on electrical properties such as a leakage current between the source region and the drain region in driving the TFT 120.

A protective film 115 is formed over the source electrode 110, the drain electrode 111, the first light shielding film 112, the source line 113, the second light shielding film 114, and the insulating film 104 so as to cover them. The protective film 115 has a single layer structure or a stacked layer structure using a silicon oxide film, a silicon nitride film, a silicon oxynitride film, a silicon nitride oxide film, other insulating films containing silicon, or the like. The thickness of the protective film 115 is preferably 100 to 500 nm, and more preferably 200 to 300 nm.

A pixel electrode 116 is formed to be electrically connected to the drain electrode 111 through an opening that is formed in a part of the protective film 115 over the drain electrode 111. An auxiliary wire 117 is formed to be electrically connected to the source line 113 and the source electrode 110 through openings that are formed in a part of the protective film 115 over the source line 113 and the source electrode 110. Note that the pixel electrode 116 and the auxiliary wire 117 are formed at the same time using the same conductive material, and the thickness thereof is preferably 10 to 150 nm, and more preferably 40 to 100 nm.

The conductive material used here may be indium tin oxide (ITO) used as a transparent conductive film, IZO (Indium Zinc Oxide) in which zinc oxide (ZnO) of 2 to 20 wt % is mixed with indium oxide, ITO containing silicon oxide, or the like.

An alignment film is formed over the aforementioned active matrix substrate of the invention, and a counter electrode, a colored layer (also referred to as a color filter), an alignment film, and the like are formed over a counter substrate. Then, the active matrix substrate is attached to the counter substrate with a liquid crystal layer interposed therebetween, thereby completing a liquid crystal display panel.

According to the invention, the second insulator and the third insulator can be formed at the same time as the first insulator 106 that is formed over the active matrix substrate to form the source electrode 110 and the drain electrode 111 of the bottom gate TFT 120. In addition, the first light shielding film 112, the second light shielding film 114, the third light shielding film (not shown), and the source line 113 can be separately formed at the same time from the same conductive film forming the source electrode 110 and the drain electrode 111.

The source line 113 and the source electrode 110 that are separately formed are electrically connected to each other through the auxiliary wire 117 formed at the same time as the pixel electrode 116 that is electrically connected to the TFT 120.

Accordingly, the active matrix substrate having the structure of the invention can include the light shielding films (first light shielding film 112, second light shielding film 114, and third light shielding film) to prevent light leakage in the pixel portion, and the light shielding film (first light shielding film 112) of the active layer (channel forming region) of the bottom gate TFT without requiring additional steps.

Embodiment Mode 2

Figure 2A:
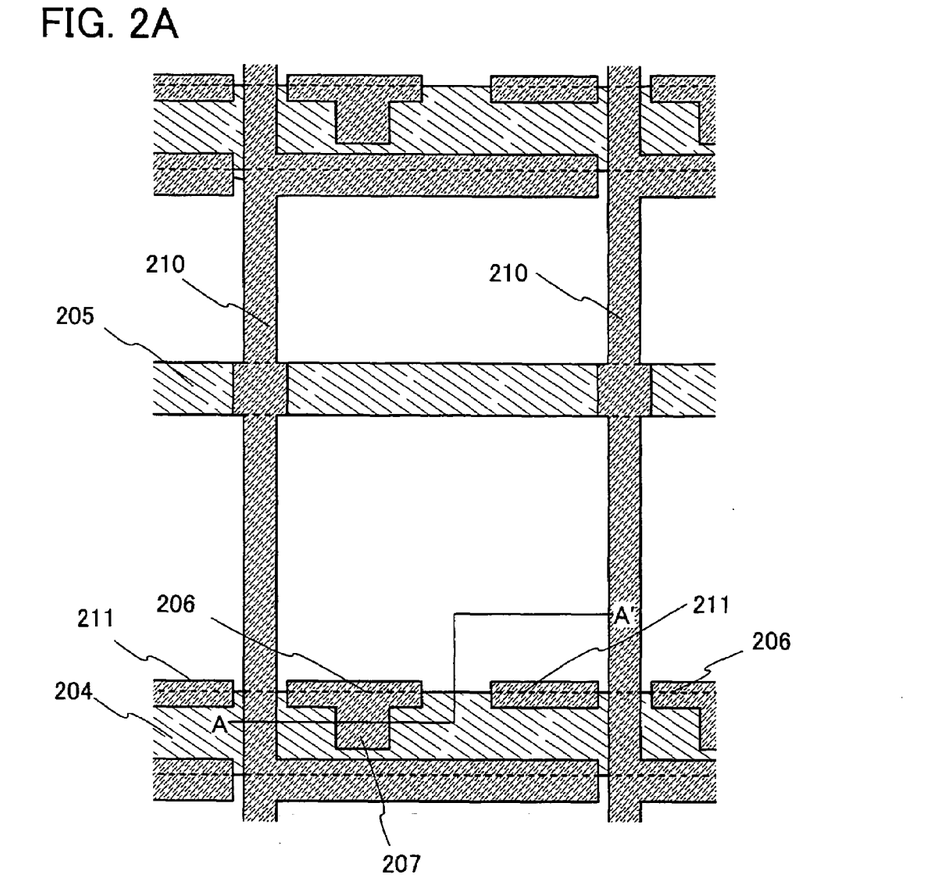
FIGS. 2A and 2B are respectively a plan view and a cross sectional view of an active matrix substrate.
Figure 2B:
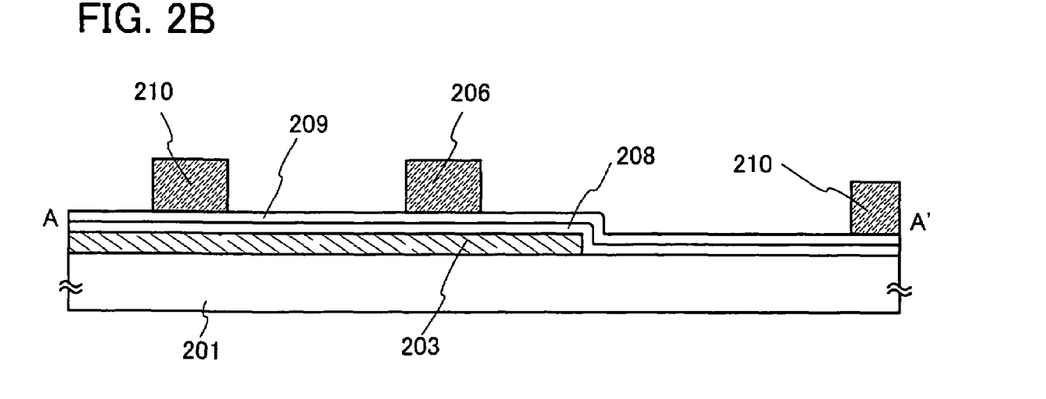
Figure 3A:
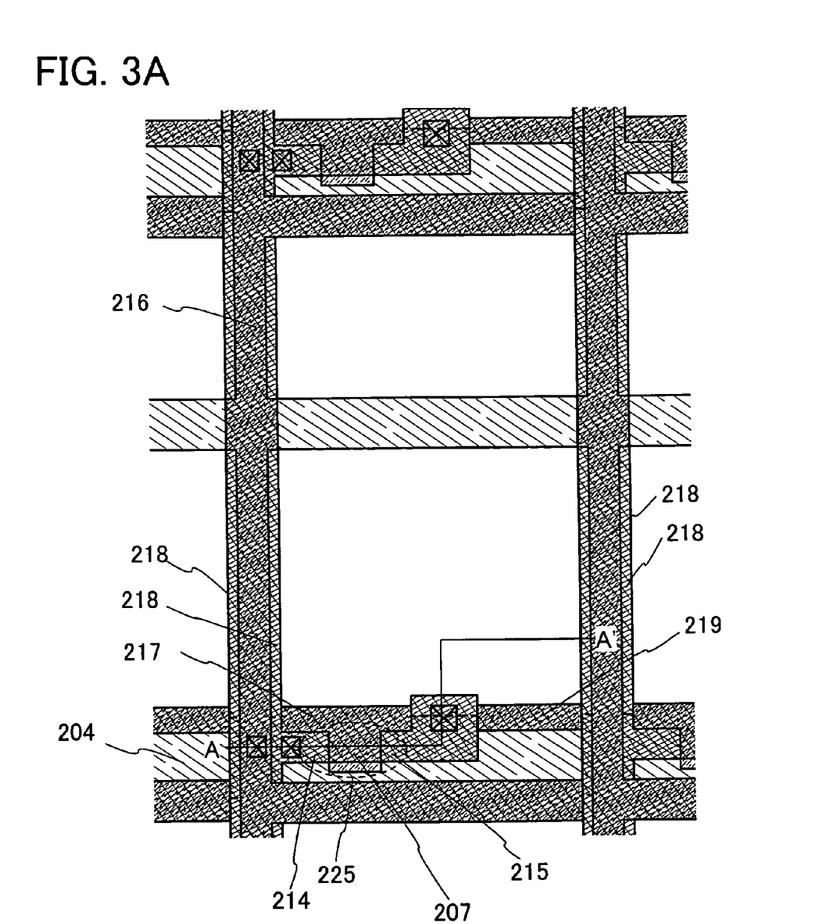
FIGS. 3A and 3B are respectively a plan view and a cross sectional view of an active matrix substrate.
Figure 3B:
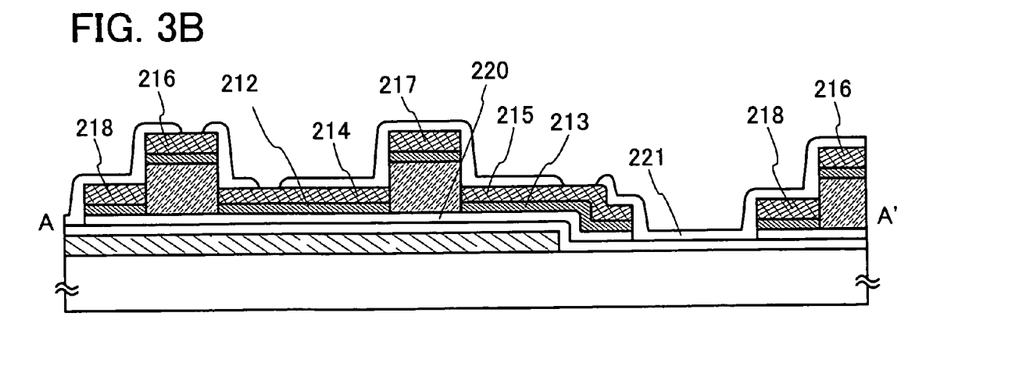
Figures 4A, 4B:
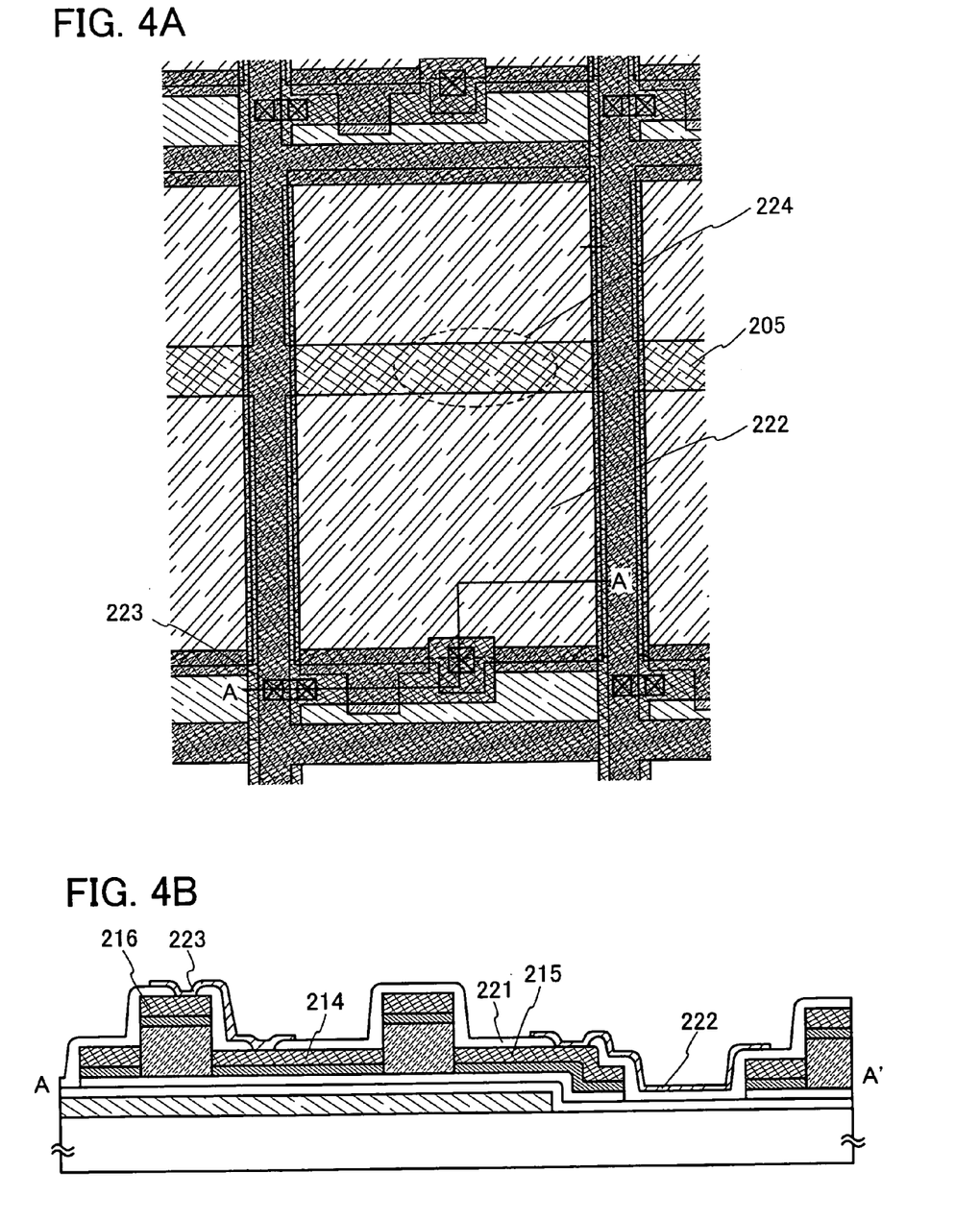
FIGS. 4A and 4B are respectively a plan view and a cross sectional view of an active matrix substrate.

In Embodiment Mode 2, a method for manufacturing the active matrix substrate shown in Embodiment Mode 1 is described with reference to FIGS. 2A to 4B. Note that FIGS. 2A, 3A, and 4A are plan views showing a pixel portion of the active matrix substrate, and FIGS. 2B, 3B, and 4B are cross sectional views along a line A-A' of FIGS. 2A, 3A, and 4A, respectively. In FIGS. 2A to 4B, description is made using same reference numerals.

As shown in FIGS. 2A and 2B, a first conductive film 203 is formed over a substrate 201. The first conductive film 203 is formed by a deposition method such as sputtering, PVD, CVD, droplet discharging, printing, and electroplating using a metal element such as Ag, Au, Cu, Ni, Pt, Pd, Ir, Rh, W, Al, Ta, Mo, Cd, Zn, Fe, Ti, Zr, Ba, and Nd, an alloy material that mainly contains these elements, a compound material such as metal nitride, Si or SiGe including an acceptor element or a donor element, indium tin oxide (ITO) used as a transparent conductive film, IZO (Indium Zinc Oxide) in which zinc oxide (ZnO) of 2 to 20 wt % is mixed with indium oxide, ITO containing silicon oxide, or the like.

A gate line 204 and a storage capacitor line 205 are formed by patterning the first conductive film 203, and a gate electrode 207 is formed in a part of a gate line 204 so as to overlap a first insulator 206 that is formed later. When the first conductive film 203 is formed by a deposition method such as sputtering and CVD, a mask is formed over the conductive film by droplet discharging, photolithography, or a method in which a photosensitive material is light exposed using a laser beam direct drawing apparatus and developed. Then, the conductive film is patterned into a desired shape using the mask.

Since the pattern can be directly formed when droplet discharging is used, the gate line 204, the storage capacitor line 205, and the gate electrode 207 are formed by discharging and heating a liquid substance in which the aforementioned metal particles are dissolved or dispersed in an organic resin. The organic resin may be one or more kinds of organic resins that serve as a binder, a solvent, a dispersing agent, and a coating agent of metal particles. Typically, polyimide, acrylic, a novolac resin, a melamine resin, a phenol resin, an epoxy resin, a silicone resin, a furan resin, a diallyl phthalate resin, and other known organic resins can be given.

The viscosity of the liquid substance is preferably 5 to 20 mPa·s for preventing drying and for allowing the metal particles to be discharged smoothly from an orifice. The surface tension of the liquid substance is preferably 40 m/N or less. Note that the viscosity and the like of the liquid substance may be set appropriately in accordance with a solvent to be used or the application.

Although the diameter of the metal particles contained in the liquid substance may be a few nm to 10 μm, it is preferably as small as possible in order to prevent a nozzle from clogging and to make fine patterns. More preferably, each metal particle has a diameter of 0.1 μm or less.

Subsequently, an insulating film 208 including a gate insulating film as a part thereof is formed. The insulating film 208 is formed by a deposition method such as CVD and sputtering using a single layer structure or a stacked layer structure of a silicon oxide film, a silicon nitride film, a silicon oxynitride film, a silicon nitride oxide film, and other insulating films containing silicon. The thickness of the insulating film 208 is preferably 10 to 150 nm, and more preferably 30 to 70 nm.

A first semiconductor film 209 is formed. The first semiconductor film 209 is formed by a deposition method such as CVD and sputtering using a film such as an amorphous semiconductor film, an SAS film, and a μc film, each of which mainly contains silicon, silicon-germanium (SiGe), or the like. The first semiconductor film 209 may also contain an acceptor element or a donor element such as phosphorus, arsenic, and boron additionally to the aforementioned main component. The thickness of the first semiconductor film 209 is preferably 10 to 150 nm, and more preferably 30 to 70 nm.

The first insulator 206, a second insulator 210, and a third insulator 211 are formed over the first semiconductor film 209. The first insulator 206, the second insulator 210, and the third insulator 211 are formed in the following manner: an insulating film such as a silicon oxide film, a silicon nitride film, a silicon oxynitride film, a silicon nitride oxide film, and other insulating films containing silicon (either a single layer structure or a stacked layer structure may be adopted) is formed by a deposition method such as plasma CVD and sputtering; and the insulating film is patterned into a desired shape using a mask that is formed over the insulating film by droplet discharging, photolithography, or a method in which a photosensitive material is light exposed using a laser beam direct drawing apparatus and developed.

The thickness of the first insulator 206, the second insulator 210, and the third insulator 211 is set to be larger than the thickness of a stacked film of a source region 212 and a source electrode 214 that are formed later, and a stacked film of a drain region 213 and a drain electrode 215 that are formed later. Specifically, the thickness of the first insulator 206, the second insulator 210, and the third insulator 211 is preferably 500 nm or more.

Note that the first insulator 206, the second insulator 210, and the third insulator 211 are preferably formed by plasma CVD or the like since the surface in contact with the first semiconductor film 209 is required to be dense. However, this deposition takes time. Therefore, particularly when the film is thick, a dense insulating film with a thickness of 200 nm or less may be formed over the first semiconductor film 209 by adjusting deposition conditions and the like, and a porous insulating film may be continuously formed thereover, thereby forming a film with a thickness of 500 nm or more.

Then, a second semiconductor film having one type conductivity is formed as shown in FIGS. 3A and 3B. The second semiconductor film is formed by a deposition method such as CVD and sputtering. A film formed here such as an amorphous semiconductor film, an SAS film, and a μc film, each of which mainly contains silicon or silicon-germanium (SiGe), includes an acceptor element or a donor element such as phosphorus, arsenic, and boron additionally to the aforementioned main component. Note that the second semiconductor film is separated into a portion formed over the first insulator 206, the second insulator 210, and the third insulator 211, and a portion formed over the first semiconductor film 209. A part of the second semiconductor film formed over the first semiconductor film 209 corresponds to the source region 212 and the drain region 213 of the TFT 225 (see FIG. 3B).

A second conductive film is formed over the second semiconductor film. The thickness of the second conductive film is preferably 200 nm or more, and more preferably 300 to 700 nm. A light shielding conductive material used for the second conductive film may be a film containing a metal element such as Ag, Au, Cu, Ni, Pt, Pd, Ir, Rh, W, Al, Ta, Mo, Cd, Zn, Fe, Ti, Zr, and Ba, a film containing an alloy material that mainly contains these elements, a film containing a compound material such as metal nitride, or the like. Alternatively, a film containing Si or SiGe including an acceptor element or a donor element may also be used. Note that the second conductive film is separated into a portion formed over the first insulator 206, the second insulator 210, and the third insulator 211 and the other portion, similarly to the second semiconductor film.

The second conductive film is patterned into a desired shape, thereby forming the source electrode 214, the drain electrode 215, a source line 216, a first light shielding film 217, a second light shielding film 218, and a third light shielding film 219. Then, the first semiconductor film 209 and the second semiconductor film are etched using as masks the source electrode 214, the drain electrode 215, the source line 216, the first light shielding film 217, the second light shielding film 218, and the third light shielding film 219, thereby obtaining a desired shape. Through the aforementioned steps, the source region 212, the drain region 213, and a channel forming region 220 are formed (FIG. 3B). Note that the second conductive film can be formed into a desired shape by: forming a mask over the second conductive film by droplet discharging, photolithography, or a method in which a photosensitive material is light exposed using a laser beam direct drawing apparatus and developed; and etching the second conductive film into a desired shape using the mask.

Among the aforementioned films, the first light shielding film 217, the second light shielding film 218, and the third light shielding film 219 are formed to cover the periphery of pixels of a pixel portion over the active matrix substrate, and thus have a function as a light shielding film to prevent light leakage in image display.

The gate electrode 207 and the first light shielding film 217 partially overlap each other, and the gate line 204 and the source line 216 partially overlap each other. According to the invention, however, the first insulator 206 is sandwiched between the gate electrode 207 and the first light shielding film 217, and the second insulator 210 is sandwiched between the gate line 204 and the source line 216; therefore, parasitic capacitance in each overlapping portion can be reduced.

Further, if the TFT 225 formed over the substrate is a bottom gate TFT as shown in FIGS. 3A and 3B, when the first light shielding film 217 is provided so as to overlap a part of the first semiconductor film 209 (channel forming region of the TFT 225), an active layer (channel forming region) of the TFT 225 can be prevented from being irradiated with light even if light is emitted from a side of the substrate 201 over which the TFT 225 is formed. The prevention of irradiation of the active layer (channel forming region) of the TFT 225 with light can prevent effects on electrical properties such as a leakage current between the source region and the drain region in driving the TFT 225.

Subsequently, a protective film 221 is formed. The protective film 221 is formed by a deposition method such as plasma CVD and sputtering using a single layer structure or a stacked layer structure of an insulating film such as a silicon oxide film, a silicon nitride film, a silicon nitride oxide film, and a silicon oxynitride film. The thickness of the protective film 221 is preferably 100 to 500 nm, and more preferably 200 to 300 nm.

A pixel electrode 222 is formed to be electrically connected to the drain electrode 215 through an opening that is formed in a part of the protective film 221 so as to overlap the drain electrode 215 (FIGS. 3A to 4B). At this time, openings are formed also in a part of the protective film 221 so as to overlap the source line 216 and the source electrode 214, and an auxiliary wire 223 is formed to electrically connect the source line 216 and the source electrode 214 through the openings.

The pixel electrode 222 and the auxiliary wire 223 are formed by patterning a transparent conductive film such as indium tin oxide (ITO), IZO (Indium Zinc Oxide) in which zinc oxide (ZnO) of 2 to 20 wt % is mixed with indium oxide, and ITO containing silicon oxide, which is formed by sputtering, evaporation, CVD, coating, or the like. The thickness of the pixel electrode 222 and the auxiliary wire 223 is preferably 10 to 150 nm, and more preferably 40 to 100 nm.

In addition, as shown in FIGS. 4A and 4B, a storage capacitor 224 is formed in a portion in which the storage capacitor line 205 overlaps a part of the pixel electrode 222.

Through the aforementioned steps, the active matrix substrate shown in FIGS. 4A and 4B can be completed.

After the active matrix substrate shown in FIGS. 4A and 4B is completed, alignment films are formed over the surface of the active matrix substrate and the surface of the counter substrate, and these substrates are attached to each other. Then, a liquid crystal material is injected between the active matrix substrate and the counter substrate and completely sealed with a sealing member, thereby forming a liquid crystal display panel. Although the TFT with a single gate structure is described here, the invention is not limited to this and it is possible to adopt a multi-gate TFT having a plurality of channel forming regions, for example, a double gate TFT in which two gate electrodes are arranged in parallel over a plane surface to form two channel forming regions. Note that a structure of the liquid crystal display panel is described in detail in Embodiment Mode 3.

Embodiment Mode 3

Figure 5A:
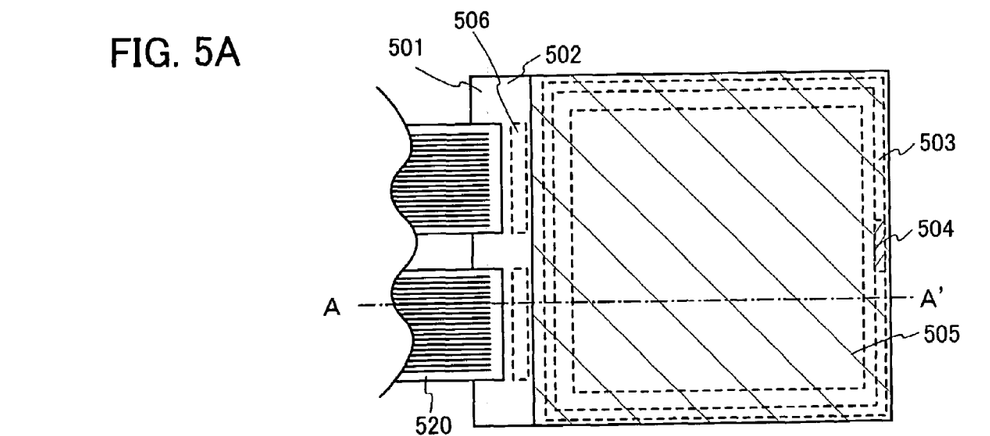
FIGS. 5A and 5B are diagrams each showing a liquid crystal display panel of the invention.
Figure 5B:
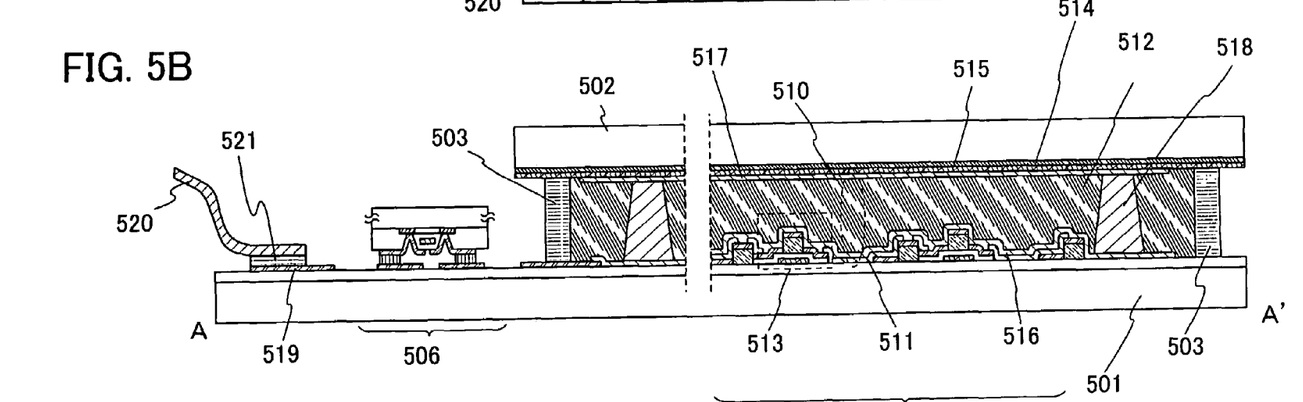

In this embodiment mode, the structure of the liquid crystal display panel of the invention is described with reference to FIGS. 5A and 5B. FIG. 5A is a top view of a panel in which the space between a first substrate 501 as an active matrix substrate and a second substrate 502 as a counter substrate is sealed with a first sealing member 503 and a second sealing member 504. FIG. 5B is a cross sectional view along a line A-A' of FIG. 5A. The active matrix substrate described in Embodiment Mode 1 or 2 is used as the first substrate 501.

In FIG. 5A, a portion 505 surrounded by a dotted line is a pixel portion, and a portion 506 surrounded by a dotted line is a driver circuit portion. In this embodiment mode, the pixel portion 505 is formed in an area sealed with the first sealing member 503 and the second sealing member 504, and the driver circuit portion 506 is provided outside the area.

The first sealing member 503 and the second sealing member 504 that are used for sealing the space between the first substrate 501 and the second substrate 502 contain a gap material for maintaining the distance of the enclosed space. The space surrounded by the first and second substrates and the first and second sealing members is filled with a liquid crystal material.

Next, the cross sectional structure is described with reference to FIG. 5B. The pixel portion 505 is formed over the first substrate 501 and includes a plurality of semiconductor elements typified by TFTs. In this embodiment mode, the driver circuit portion 506 provided over the substrate includes a source signal line driver circuit and a gate signal line driver circuit.

The pixel portion 505 includes a plurality of pixels, in each of which a first electrode 511 as a pixel electrode is electrically connected to a driving TFT 513 through a wire. On the other hand, a colored layer (color filter) 514 and a second electrode 515 as a counter electrode are formed over the second substrate 502. Alignment films 516 and 517 are formed over the first electrode 511 and the second electrode 515 respectively. A liquid crystal layer 512 is sandwiched between these alignment films 516 and 517. A portion in which the liquid crystal layer 512 is sandwiched between the first electrode 511 and the second electrode 515 is a liquid crystal element 510.

Reference numeral 518 denotes a columnar spacer that is provided to control the distance (cell gap) between the first substrate 501 and the second substrate 502. The spacer 518 is formed by etching an insulating film into a desired shape. Note that a spherical spacer may be used as well.

Various signals and potentials are supplied to the pixel portion 505 and the driver circuit portion 506 from an FPC 520 through a connecting wire 519. The connecting wire 519 and the FPC 520 are electrically connected to each other with an anisotropic conductive film or an anisotropic conductive resin 521. Note that a conductive paste such as solder may be used instead of the anisotropic conductive film or the anisotropic conductive resin.

Although not shown, a polarizer is fixed with an adhesive onto one or both of the surface of the first substrate 501 and the surface of the second substrate 502. Note that a wave plate may be provided additionally to the polarizer.

Embodiment Mode 4

In this embodiment mode, a method for mounting a driver circuit in the liquid crystal display panel of the invention is described with reference to FIGS. 6A to 6C.

Figure 6A:
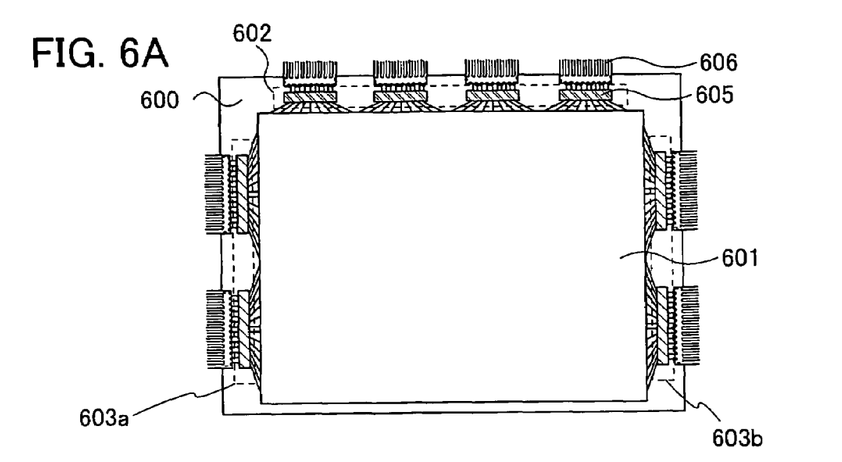
FIGS. 6A to 6C are diagrams each showing a driver circuit of a liquid crystal display panel of the invention.

In FIG. 6A, a source signal line driver circuit 602 and gate signal line driver circuits 603a and 603b are mounted on the periphery of a pixel portion 601. That is to say, the source signal line driver circuit 602, the gate signal line driver circuits 603a and 603b, and the like are mounted by mounting an IC chip 605 on a substrate 600 by a method using a known anisotropic conductive adhesive and an anisotropic conductive film, COG, wire bonding, reflow treatment using a solder bump, or the like. Note that the IC chip 605 is connected to an external circuit through an FPC (Flexible Printed Circuit) 606.

A part of the source signal line driver circuit 602, for example an analog switch may be integrally formed over the substrate and the other part may be separately mounted using an IC chip.

Figure 6B:
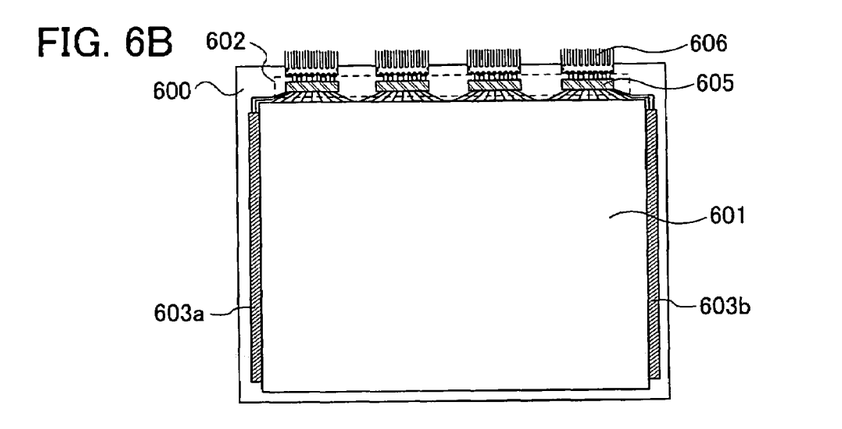

In FIG. 6B, the pixel portion 601, the gate signal line driver circuits 603a and 603b, and the like are integrally formed over the substrate, and the source signal line driver circuit 602 and the like are separately mounted using an IC chip. That is to say, the IC chip 605 is mounted by COG or the like on the substrate 600 over which the pixel portion 601, the gate signal line driver circuits 603a and 603b, and the like are integrally formed, so that the source signal line driver circuit 602 and the like are mounted. Note that the IC chip 605 is connected to an external circuit through the FPC 606.

A part of the source signal line driver circuit 602, for example an analog switch may be integrally formed over the substrate and the other part may be separately mounted using an IC chip.

Figure 6C:
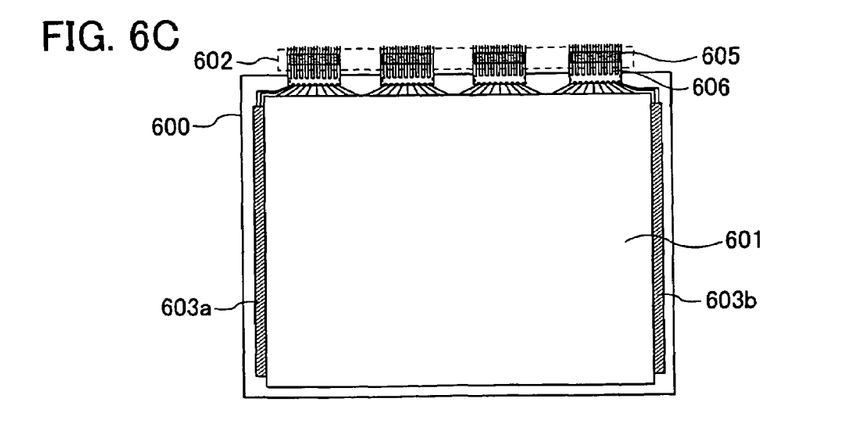

In FIG. 6C, the source signal line driver circuit 602 and the like are mounted by TAB. The IC chip 605 is connected to an external circuit through the FPC 606. Although the source signal line driver circuit 602 and the like are mounted by TAB in FIG. 6C, the gate signal line driver circuit and the like may be mounted by TAB as well.

When the IC chip 605 is mounted by TAB, the pixel portion can occupy a large area in the substrate, leading to a narrower frame.

Instead of the IC chip 605, an IC formed over a glass substrate (hereinafter referred to as a driver IC) may be provided. Since the IC chip 605 is formed over a circular silicon wafer, the shape of a mother substrate is limited. Meanwhile, the driver IC is formed over a glass substrate, the shape of which is not limited, resulting in increased productivity. Accordingly, the shape and size of the driver IC can be determined freely. For example, when a driver IC with a long side of 15 to 80 mm is formed, a smaller number of driver ICs are required as compared to the case of mounting IC chips. As a result, the number of connecting terminals can be reduced and productive yield can be increased.

The driver IC can be formed using a crystalline semiconductor formed over a substrate, and the crystalline semiconductor may be formed by irradiation with a continuous wave laser beam. A semiconductor film obtained by irradiation with a continuous wave laser beam has few crystal defects and large crystal grains. Accordingly, a transistor having such a semiconductor film is improved in mobility and response speed and can operate at high speed, which is suitable for a driver IC.

Embodiment Mode 5

In this embodiment mode, a liquid crystal module incorporated in the liquid crystal display device of the invention, which displays color images using white light, is described with reference to a cross sectional view of FIG. 7. Note that the liquid crystal display panel formed by implementing Embodiment Modes 1 to 4 can be applied to the liquid crystal module described in Embodiment Mode 5.

Figure 7:
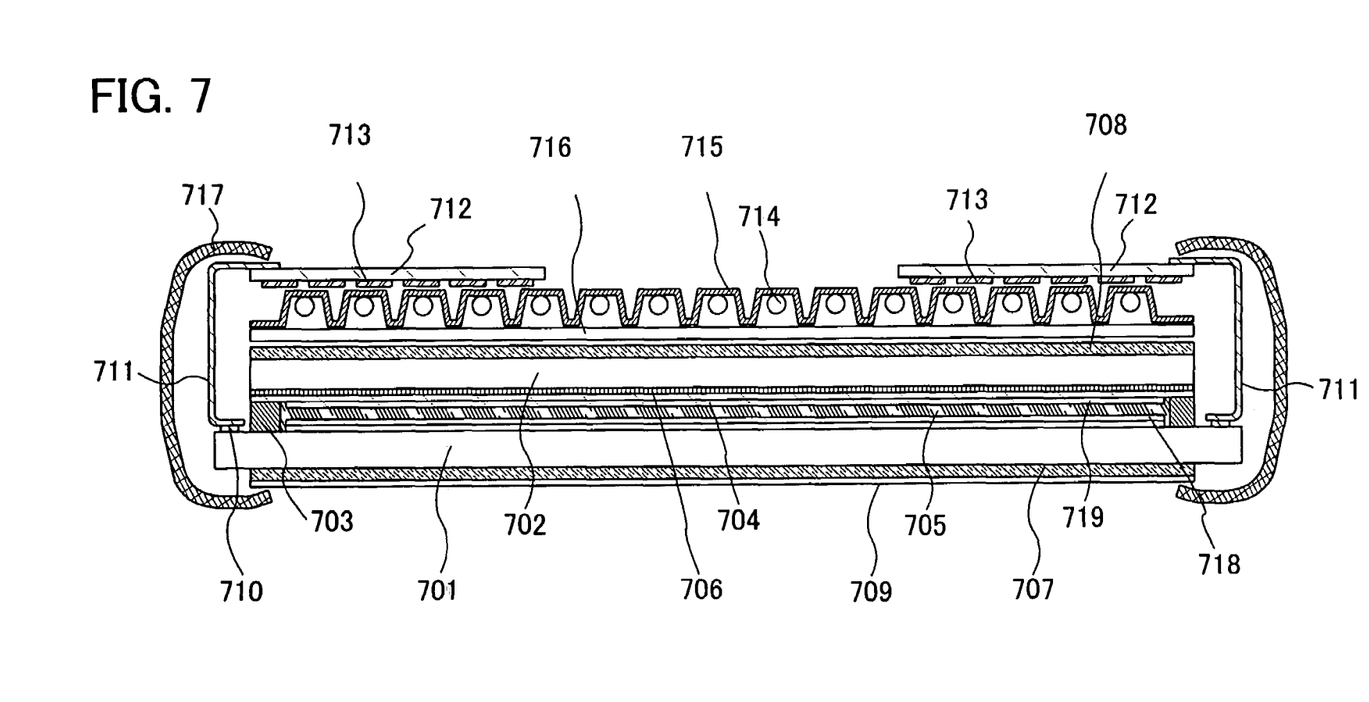
FIG. 7 is a diagram showing a liquid crystal display device.

As shown in FIG. 7, an active matrix substrate 701 and a counter substrate 702 are attached with a sealing member 703, and a liquid crystal layer 705 is provided between the active matrix substrate 701 and the counter substrate 702, thereby forming a liquid crystal display panel.

A colored film 706 is formed over the active matrix substrate 701 in order to display color images. In the case of the RGB system, a colored film corresponding to each color of red, green, and blue is provided for each pixel. Alignment films 718 and 719 are formed inside the active matrix substrate 701 and the counter substrate 702. Polarizers 707 and 708 are provided outside the active matrix substrate 701 and the counter substrate 702. A protective film 709 is formed over the surface of the polarizer 707 to reduce the external impact.

A connecting terminal 710 provided over the active matrix substrate 701 is connected to a wiring substrate 712 through an FPC 711. The wiring substrate 712 includes a pixel driver circuit (IC chip, driver IC, and the like), and an external circuit 713 such as a control circuit and a power supply circuit.

A back light unit includes a cold cathode tube 714, a reflecting plate 715, an optical film 716, and an inverter (not shown), which functions as a light source to emit light to the liquid crystal display panel. The liquid crystal display panel, the light source, the wiring substrate 712, the FPC 711, and the like are held and protected by a bezel 717.

Embodiment Mode 6

The liquid crystal display device of the invention can be applied to electronic apparatuses such as a television set (also simply referred to as a television or a television receiver), a digital camera, a digital video camera, a mobile phone set (also simply referred to as a mobile phone or a cell phone), a portable information terminal such as a PDA, a portable game machine, a monitor for computer, a computer, an audio reproducing device such as a car audio system, and an image reproducing device provided with a recording medium, such as a home-use game machine. Preferred embodiments of them are described with reference to FIGS. 8A to 8F.

Figure 8A:
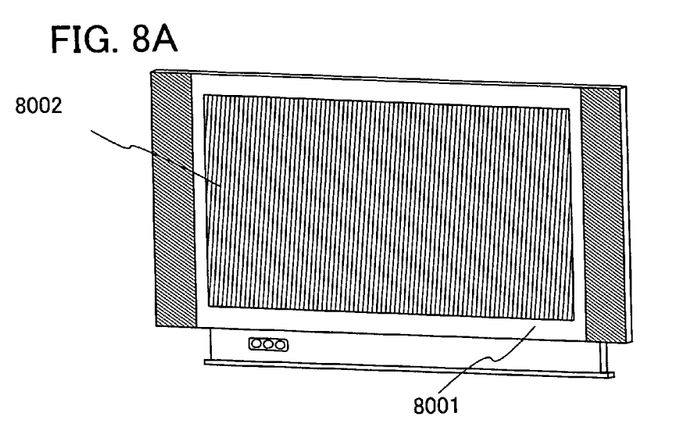
FIGS. 8A to 8F are views showing electronic apparatuses.

A television set shown in FIG. 8A includes a main body 8001, a display portion 8002, and the like. The liquid crystal display device of the invention can be applied to the display portion 8002. Since a light shielding film is formed over an active matrix substrate in the liquid crystal display device of the invention, light leakage from a portion between pixel electrodes and the like can be prevented. As a result, a television set capable of displaying images with high visibility can be provided.

Figure 8B:
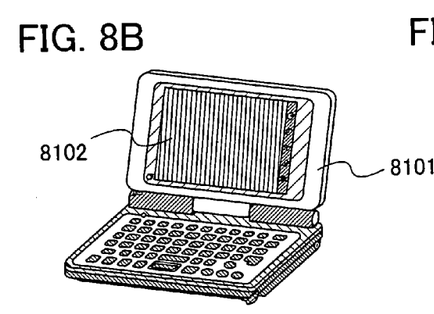

A portable information terminal shown in FIG. 8B includes a main body 8101, a display portion 8102, and the like. The liquid crystal display device of the invention can be applied to the display portion 8102. Since a light shielding film is formed over an active matrix substrate in the liquid crystal display device of the invention, light leakage from a portion between pixel electrodes and the like can be prevented. As a result, a portable information terminal capable of displaying images with high visibility can be provided.

Figure 8C:
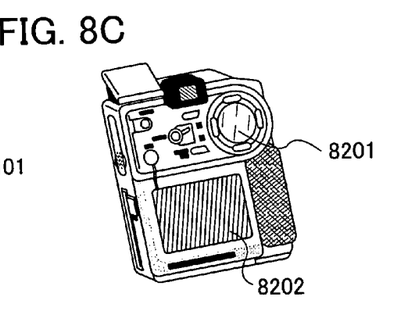

A digital video camera shown in FIG. 8C includes a main body 8201, a display portion 8202, and the like. The liquid crystal display device of the invention can be applied to the display portion 8202. Since a light shielding film is formed over an active matrix substrate in the liquid crystal display device of the invention, light leakage from a portion between pixel electrodes and the like can be prevented. As a result, a digital video camera capable of displaying images with high visibility can be provided.

Figure 8D:
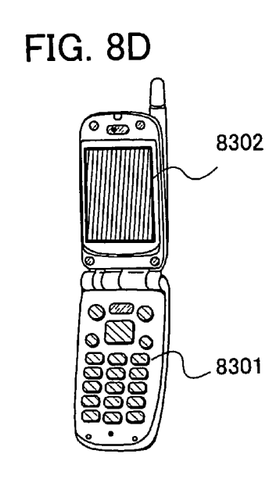

A mobile phone set shown in FIG. 8D includes a main body 8301, a display portion 8302, and the like. The liquid crystal display device of the invention can be applied to the display portion 8302. Since a light shielding film is formed over an active matrix substrate in the liquid crystal display device of the invention, light leakage from a portion between pixel electrodes and the like can be prevented. As a result, a mobile phone set capable of displaying images with high visibility can be provided.

Figures 8E, 8F:
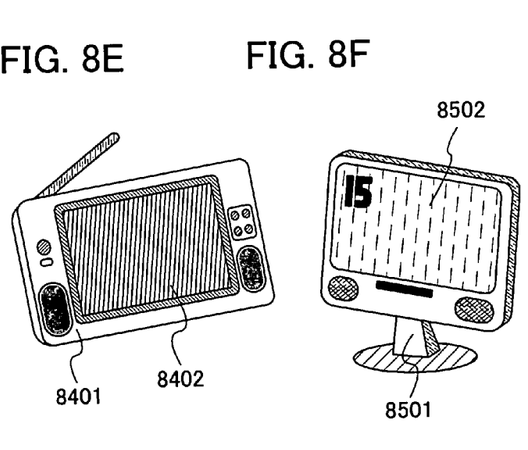

A portable television set shown in FIG. 8E includes a main body 8401, a display portion 8402, and the like. The liquid crystal display device of the invention can be applied to the display portion 8402. Since a light shielding film is formed over an active matrix substrate in the liquid crystal display device of the invention, light leakage from a portion between pixel electrodes and the like can be prevented. As a result, a portable television set capable of displaying images with high visibility can be provided. The liquid crystal display device of the invention can be widely applied to various television sets such as a small size one incorporated in a portable terminal such as a mobile phone set, a medium size one that is portable, and a large size one (e.g., 40 inches in size or larger).

A liquid crystal monitor shown in FIG. 8F includes a main body 8501, a display portion 8502, and the like. The liquid crystal display device of the invention can be applied to the display portion 8502. Since a light shielding film is formed over an active matrix substrate in the liquid crystal display device of the invention, light leakage from a portion between pixel electrodes and the like can be prevented. As a result, a liquid crystal monitor capable of displaying images with high visibility can be provided.

As set forth above, when the liquid crystal display device of the invention, in which light leakage from a portion between pixel electrodes and the like can be prevented, is applied to a display portion of an electronic apparatus, the electronic apparatus can display images with high visibility.

This application is based on Japanese Patent Application serial No. 2005-234160 filed in Japan Patent Office on Aug. 12, 2005, the entire contents of which are hereby incorporated by reference.

What is claimed is:

1. A liquid crystal display device comprising:
   a first semiconductor film formed over a gate electrode with a gate insulating film interposed therebetween;
   a first insulator and a second insulator that are formed over the first semiconductor film;
   a source region and a drain region that are separately formed over the first semiconductor film so as not to overlap the first insulator and the second insulator;
   a second semiconductor film formed over the first semiconductor film;

a third semiconductor film formed over the first insulator and the second insulator;

a source electrode and a drain electrode that are formed over the source region and the drain region;

a first light shielding film formed over the first insulator with the third semiconductor film interposed therebetween;

a source line formed over the second insulator with the third semiconductor film interposed therebetween; and a second light shielding film formed over the second semiconductor film, wherein the first insulator is formed between the source region and the drain region, wherein the source electrode is electrically connected to the source line, and wherein the source electrode, the drain electrode, the source line, the first light shielding film, and the second light shielding film are formed of the same light shielding conductive film.

2. The liquid crystal display device according to claim 1, wherein the source region, the drain region, the second semiconductor film, and the third semiconductor film have the same thickness; and wherein the source electrode, the drain electrode, the source line, the first light shielding film, and the second light shielding film have the same thickness.

3. The liquid crystal display device according to claim 1, wherein the first light shielding film is formed so as to overlap the gate electrode; and wherein the source line is electrically connected to the source electrode.

4. The liquid crystal display device according to claim 1, further comprising an electrode electrically connected to the drain electrode;

an auxiliary wire electrically connected to the source line and to the source electrode, wherein the electrode and the auxiliary wire are formed of the same conductive film.

5. The liquid crystal display device according to claim 1, wherein the second light shielding film is formed so as not to overlap the first insulator and the second insulator; and wherein the electrode that is electrically connected to the drain electrode overlaps a part of the second light shielding film.

6. The liquid crystal display device according to claim 1, wherein the first semiconductor film is made of an amorphous semiconductor that mainly contains silicon or silicon-germanium.

7. The liquid crystal display device according to claim 1, wherein the source region, the drain region, the second semiconductor film, and the third semiconductor film are formed of the same conductive material, and wherein each of the second semiconductor film and the third semiconductor film is made of an amorphous semiconductor that mainly contains silicon or silicon-germanium, which includes an acceptor element or a donor element.

8. The liquid crystal display device according to claim 1, wherein a thickness of the first insulator and the second insulator is larger than a thickness of a stacked film of the source region and the source electrode.

9. A liquid crystal display device comprising:

a semiconductor film formed over a gate electrode with a gate insulating film interposed therebetween;

a first insulator and a second insulator that are formed over the semiconductor film;

a source region and a drain region that are separately formed over the semiconductor film so as not to overlap the first insulator;

a source electrode and a drain electrode that are formed over the source region and the drain region;

a light shielding film formed over the first insulator;

a source line formed over the second insulator; and wherein the source electrode is electrically connected to the source line, and wherein the first insulator is formed between the source region and the drain region.

10. The liquid crystal display device according to claim 9, wherein the source electrode, the drain electrode, and the light shielding film are formed of the same light shielding conductive film.

11. The liquid crystal display device according to claim 9, wherein a thickness of the first insulator and the second insulator is larger than a thickness of a stacked film of the source region and the source electrode.

12. The liquid crystal display device according to claim 9, further comprising a protective film formed over the light shielding film, the source electrode, the source line, and the drain electrode; and an electrode formed over the protective film, wherein the electrode is electrically connected to the drain electrode.

13. A liquid crystal display device comprising:

a semiconductor film formed over a gate electrode with a gate insulating film interposed therebetween;

a first insulator and a second insulator that are formed over the semiconductor film;

a source region and a drain region that are separately formed over the semiconductor film so as not to overlap the first insulator and the second insulator;

a source electrode and a drain electrode that are formed over the source region and the drain region;

a light shielding film formed over the first insulator;

a source line formed over the second insulator; and a protective film formed over the light shielding film, the source electrode, and the drain electrode, and wherein the first insulator is formed between the source region and the drain region.

14. The liquid crystal display device according to claim 13, wherein the protective film is formed in contact with both side faces of the second insulator.

15. The liquid crystal display device according to claim 13, wherein the source electrode, the drain electrode, the source line, and the light shielding film are formed of the same light shielding conductive film.

16. The liquid crystal display device according to claim 13, wherein a thickness of the first insulator and the second insulator is larger than a thickness of a stacked film of the source region and the source electrode.

17. The liquid crystal display device according to claim 13, further comprising an electrode formed over the protective film;

an auxiliary wire formed over the protective film, wherein the electrode is electrically connected to the drain electrode, wherein the auxiliary wire electrically connects the source line to the source electrode.

* * * * *